Oct. 1, 1940. C. BANCROFT Re. 21,583

DISPLACEMENT MEANS

Original Filed Nov. 17, 1937 5 Sheets-Sheet 1

INVENTOR
Charles Bancroft
BY Kenyon & Kenyon
ATTORNEYS.

Oct. 1, 1940. C. BANCROFT Re. 21,583
DISPLACEMENT MEANS
Original Filed Nov. 17, 1937 5 Sheets-Sheet 2
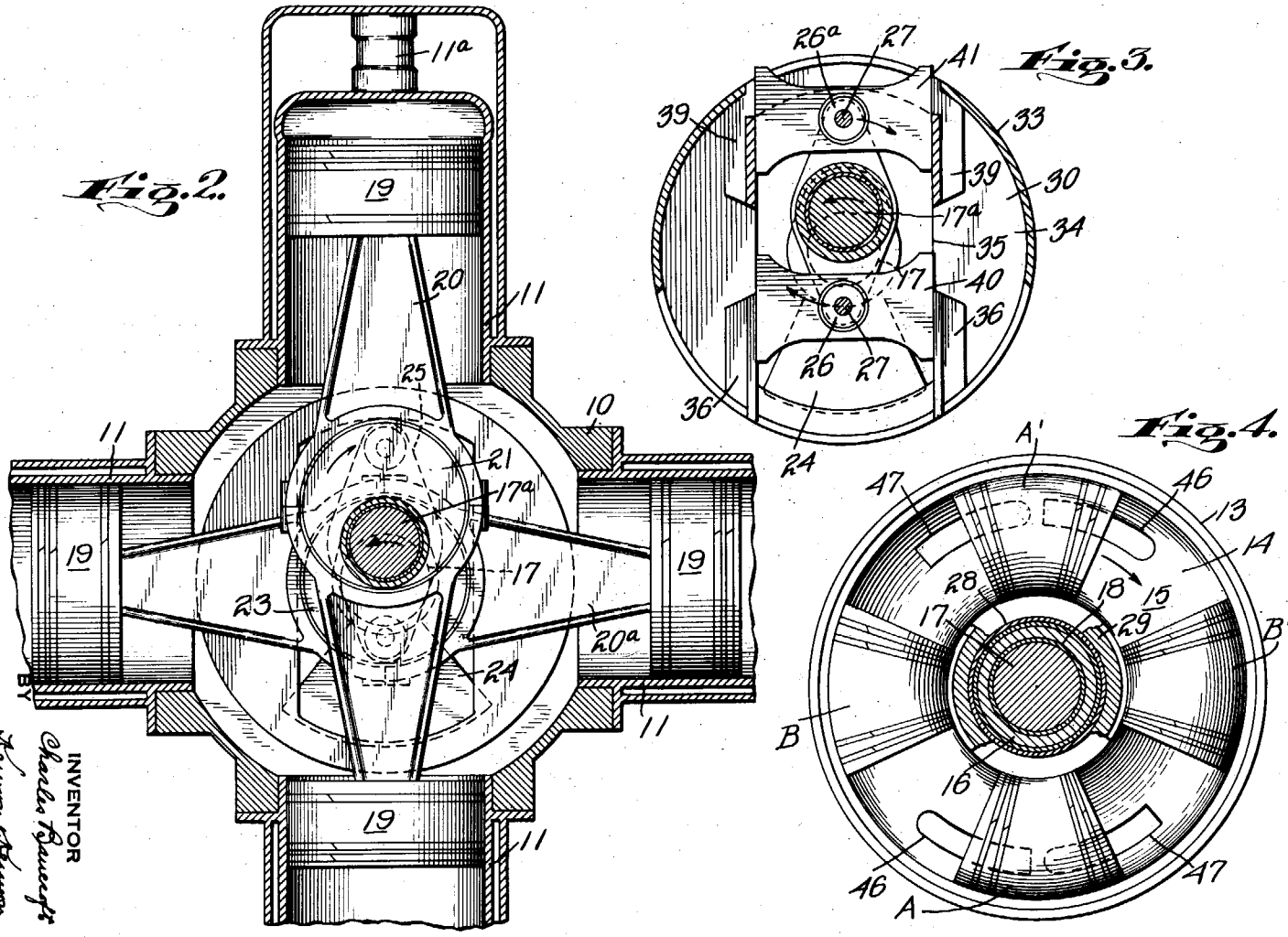
INVENTOR
Charles Bancroft
Kenyon & Kenyon
ATTORNEYS.

Oct. 1, 1940. C. BANCROFT Re. 21,583
DISPLACEMENT MEANS
Original Filed Nov. 17, 1937 5 Sheets-Sheet 3
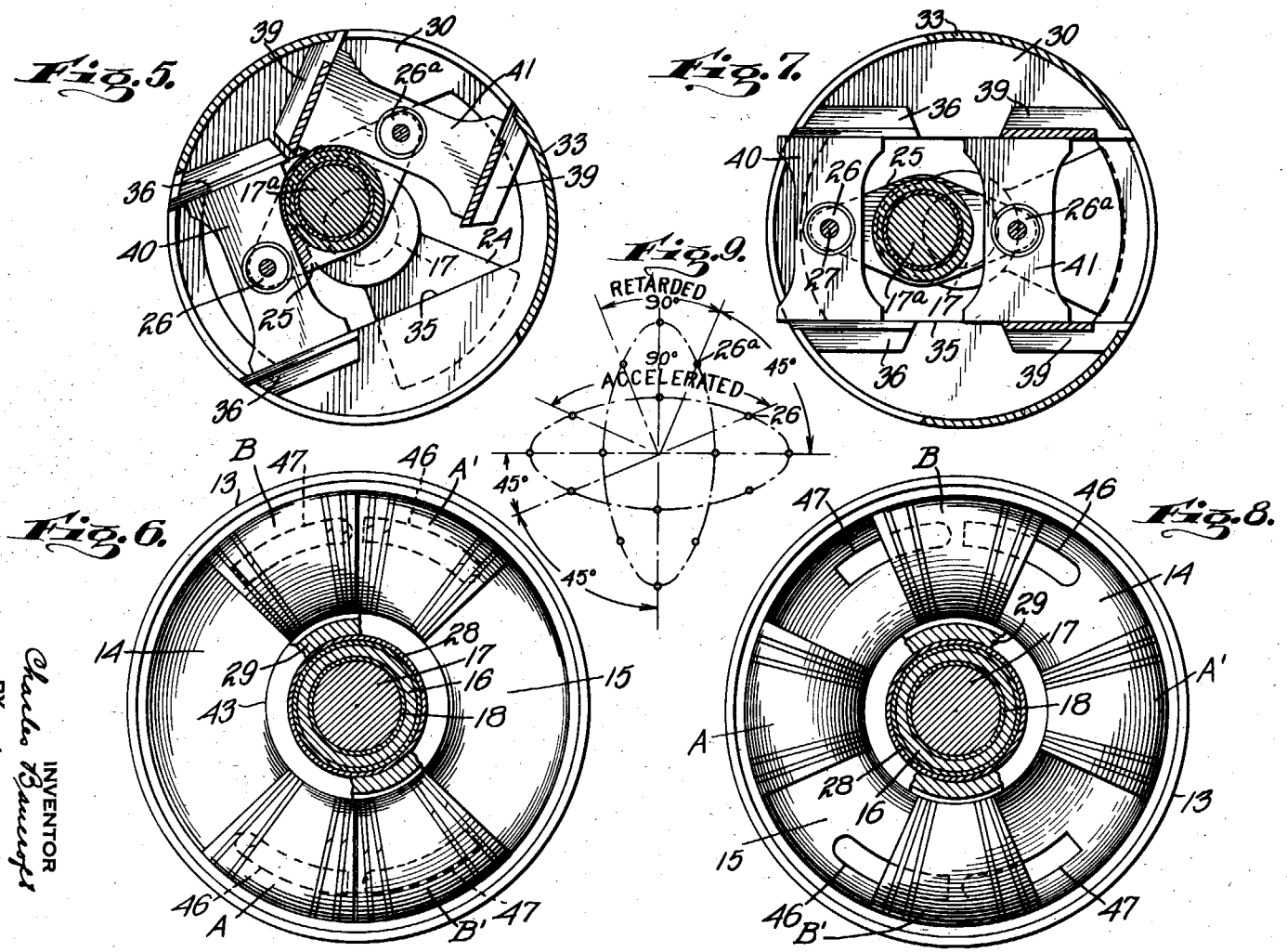
INVENTOR
Charles Bancroft
BY Kenyon & Kenyon
ATTORNEYS.

Oct. 1, 1940. C. BANCROFT Re. 21,583
DISPLACEMENT MEANS
Original Filed Nov. 17, 1937 5 Sheets-Sheet 4
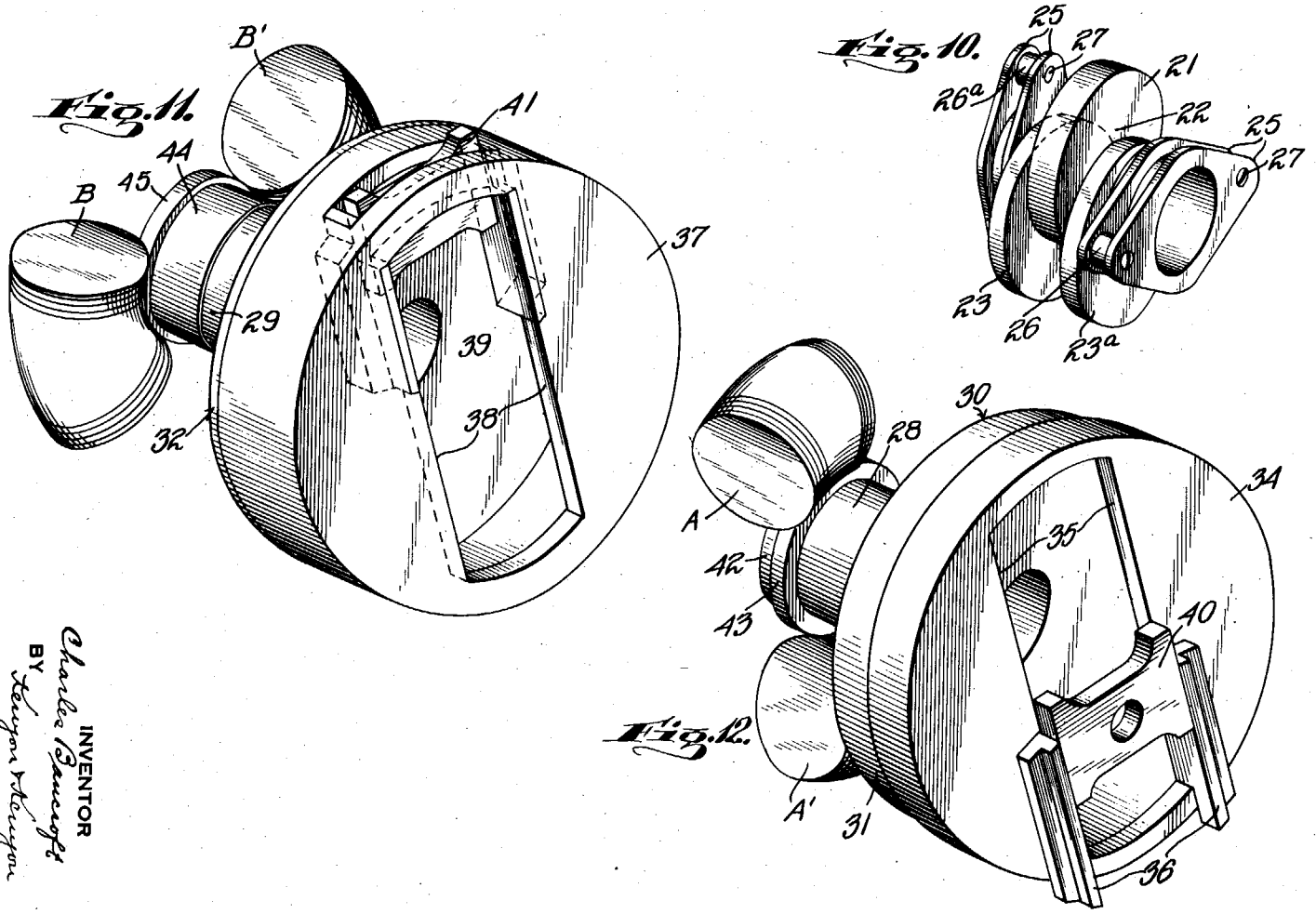
INVENTOR
Charles Bancroft
BY Kenyon & Kenyon
ATTORNEYS Oct. 1, 1940. C. BANCROFT Re. 21,583

DISPLACEMENT MEANS

Original Filed Nov. 17, 1937 5 Sheets-Sheet 5

INVENTOR
Charles Bancroft
BY Kenyon & Kenyon
ATTORNEYS.

Reissued Oct. 1, 1940 Re. 21,583

UNITED STATES PATENT OFFICE 21,583

DISPLACEMENT MEANS

Charles Bancroft, New Canaan, Conn.

Original No. 2,132,595, dated October 11, 1938, Serial No. 174,925, November 17, 1937. Application for reissue April 26, 1940, Serial No. 331,890

22 Claims. (Cl. 103—129)

This invention relates to piston type displacement means.

This invention has for an object a simple and efficient combination of a reciprocating piston displacement means having conventional cylinders and a rotary alternately accelerating piston type displacement means.

A further object of this invention is to combine the large displacement of a rotary alternately accelerating piston type pump with the ability of a reciprocating piston type displacement means to handle high pressures efficiently under varying temperature conditions.

An additional object is a mechanical movement for translating reciprocating motion into two rotary motions, each of which is subjected to alternate acceleration and deceleration, or for translating two such rotary motions into a single reciprocating motion.

The invention may be embodied in a multi-stage pump in which the rotating displacement means constitutes the low pressure stage and the reciprocating displacement means constitutes the high pressure stage or the invention may be embodied in an internal combustion engine in which the reciprocating displacement means constitutes the engine proper and the rotary displacement means constitutes a blower, a compressor, supercharger or the like. In either embodiment there is a crank shaft and mounted on the crank pin is a member which is caused to make one complete revolution for each revolution of the crank shaft but its direction of rotation is opposite to that of the crank shaft. This member is journalled in one or more rods which are caused to reciprocate along straight lines and each rod is connected to one or more pistons reciprocating in cylinders. The said member is also connected to two rotatable members coaxial with the crank shaft in such manner that it effects rotation of said members at a continuously varying speed between minimum and maximum limits. To the rotatable members are connected pairs of pistons arranged in an annular chamber coaxial with the crank shaft. These pistons are caused to rotate in a direction opposite to that of the crank shaft at a continuously varying speed so that successive pistons move relative to each other from a position of minimum spacing to a position of maximum spacing and back to a position of minimum spacing. Such action of the pistons is availed of to draw in and discharge fluid through inlet and outlet ports provided for that purpose. The reciprocating pistons, as well as the rotating pistons, are used to draw in and discharge fluid through inlet and outlet ports provided for that purpose and by the use of a combustible fluid as the fluid supplied to the reciprocating displacement means, such means may be used as an internal combustion engine. Alternatively, the crank shaft may be driven by a suitable source of power and both displacement means utilized as pumps.

Other objects, novel features and advantages of this invention will become apparent from the following specification and accompanying drawings, wherein:

Fig. 2 is a section on the line 2—2 of Fig. 1;

Fig. 3 is a section on the line 3—3 of Fig. 1;

Fig. 4 is a section on the line 4—4 of Fig. 1;

Fig. 5 is a view similar to Fig. 3 with the crank shaft rotated 45° from the position shown in Fig. 1;

Fig. 6 is a view similar to Fig. 4 with the crank shaft rotated 45° from the position shown in Fig. 1;

Fig. 7 is a view similar to Fig. 3 with the crank shaft rotated 90° from the position shown in Fig. 1;

Fig. 8 is a view similar to Fig. 4 with the crank shaft rotated 90° from the position shown in Fig. 1;

Fig. 9 is a diagrammatic illustration of the relation of the rotating pistons during one complete rotation of the crank shaft;

Figs. 10, 11 and 12 are perspective views of the various portions of the apparatus.

Figure 1:
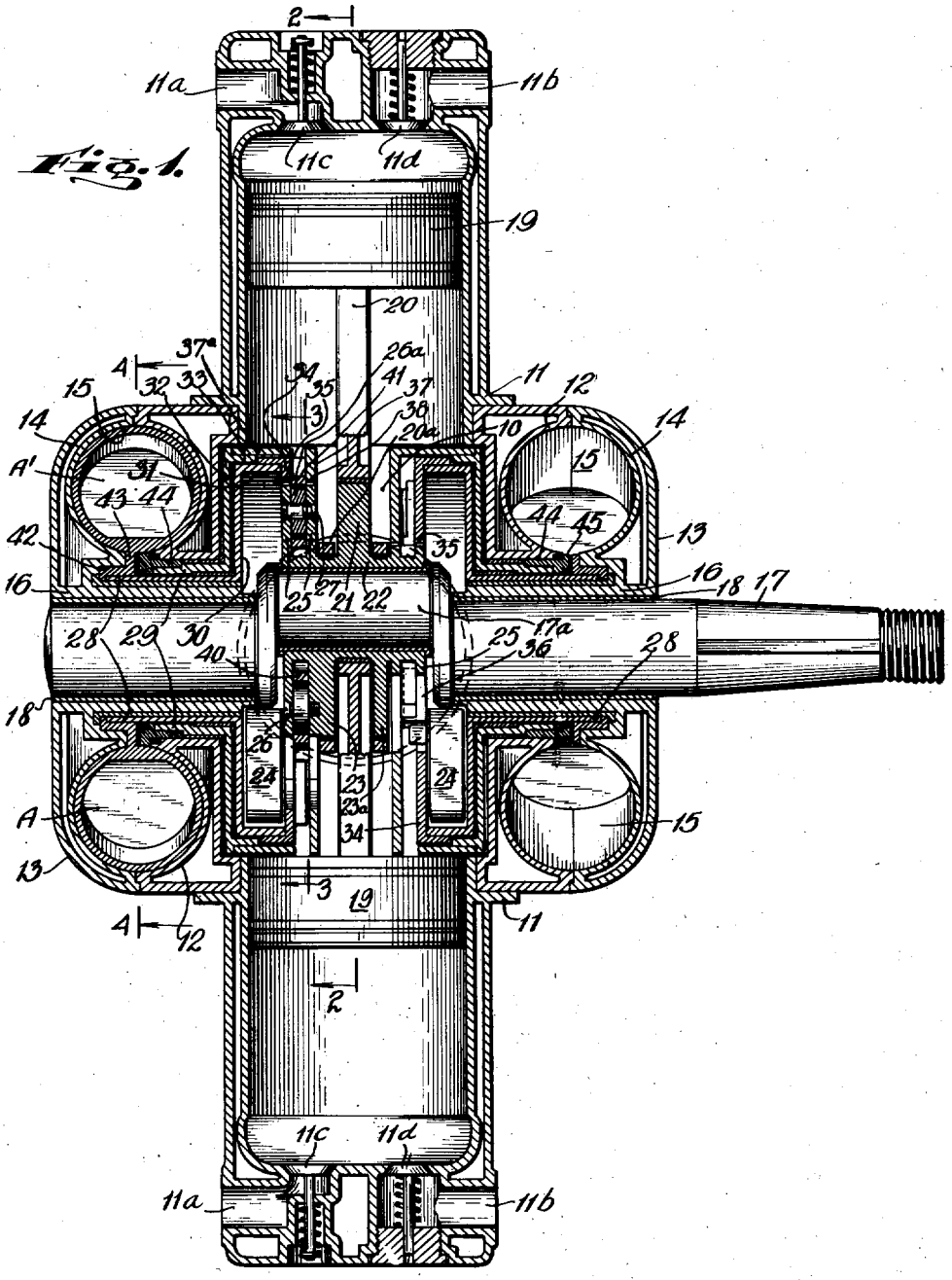
Fig. 1 is a vertical section through an apparatus embodying the invention.

Fig. 1 discloses the invention embodied in a multi-stage pump. A casing 10 is provided with four openings into which project the inner ends of four cylinders 11 radially arranged with respect to a common center. The casing is formed to provide two outwardly facing annular grooves 12 semi-circular in cross-section. Caps 13 are provided, each of which is formed to provide an inwardly facing annular groove 14, semi-circular in cross-section. The caps are suitably connected to the casing by means (not shown) so that each pair of grooves 12 and 14 co-operate to form a torus cylinder 15. Each cap is provided with an inwardly directed hollow boss 16 in which a crank shaft 17 is journalled with bushings 18 interposed between the crank shaft and the bosses.

Pistons 19 are arranged in the cylinders 11.

A continuous connecting rod 20 extends between one pair of pistons and a continuous connecting rod 20a extends between the other pair of pistons, the rod 20a being thicker at its central portion than the rod 20 and being provided with a slot in such thicker portion through which the connecting rod 20 passes. Each connecting rod is connected at each end to a piston in such manner that the rod is limited to reciprocating motion parallel to the axes of the cylinders in which the pistons are mounted. Each rod is provided with a central aperture and in the aperture of rod 20 is received a circular disk 21 forming a part of a member 22 rotatably supported by the crank pin 17a of the crank shaft 17. The central aperture of the connecting rod 20a receives the circular disks 23 and 23a constituting parts of the member 22 and being in effect a single disk. Each of the three disks is eccentric with respect to the axis of the crank pin by an amount equal to the crank throw and the disks 23 and 23a are oriented 180° with respect to the disk 21. Suitable bushings are interposed between the peripheries of the three disks and the surfaces of the apertures in the connecting rod. Means (not shown) are provided for causing rotation of the crank shaft 17 and the crank shaft is provided with counterweights 24. Ports 11a and 11b controlled by valves 11c and 11d respectively are provided for admitting and discharging fluid to and from the cylinders 11.

As is fully explained in my co-pending application, Serial No. 150,231, the member 22 makes one complete revolution with respect to the casing for each complete rotation of the crank shaft 17 but in the opposite direction and such movement is utilized to operate the rotating displacement means subsequently to be described. The member 22 is provided with two pairs of plates 25 arranged at either side of the connecting rods, these plates being of generally elliptical shape. The axis of one pair of plates is at right angles to the axis of the other pair. At the ends of each pair of plates are provided pegs 26 and 26a extending between the plates 25 and being held in position by bolts 27. The pegs are spaced equally distant from the axis of the crank pin 17a and are in alinement therewith. On each boss 16 is rotatably mounted a sleeve 28 on which is rotatably mounted a second sleeve 29, there being provided suitable bushings associated with said sleeves. The sleeve 28 is provided with a circular portion 30 from which extends an annular flange 31. The sleeve 29 is provided with a circular portion 32 from which projects an annular flange 33 which partially overlies the flange 31. A cap 34 has a flange fitting over the flange 31 and is cut away at 35 to provide a substantially rectangular recess. Guide members 36 project from the face of the cap 34 in alinement with the long sides of the recess 35 over a portion of its length. A cap 37 has a flange 37a fitting over the flange 33 and is cut away at 38 to form a substantially rectangular groove. Guide members 39 extend from the cap 37 in alinement with the long sides of the groove 38 over a portion of its length. A block 40 has an aperture through which the peg 26 passes and is arranged to slide between the guide members 36 while a block 41 has an aperture through which the peg 26a extends and the block is arranged to slide between the guide members 39.

In each torus cylinder 15 are two pairs of hollow pistons A, A′ and B, B′. The pistons A, A′ are supported by a collar 42 mounted on the sleeve 28 and having an annular flange 43 extending into the cylinder 15 through a circular slot between inner edges of the grooves 12 and 14. The pistons B and B′ are supported by a collar 44 mounted on the sleeve 29 and having a flange 45 projecting through the same slot as the flange 43. The piston A is oriented 180° from the piston A′ and the piston B is likewise oriented 180° from the piston B′. The torus cylinders are provided with inlet and outlet ports 46 and 47.

Rotation of the member 22 as a result of the rotation of the crank shaft 17 causes rotation of the sleeves 28 and 29, together with the pistons A, A′ and B, B′ in the same direction as the member 22 rotates. Although the member 22 rotates at constant speed, the sleeves 28 and 29 rotate at a continuously varying speed between minimum and maximum limits. Such action is clearly shown by reference to Figs. 3 to 9 inclusive. Fig. 9 illustrates successive positions assumed by the pegs 26 and 26a at intervals of 45° rotation of the crank shaft 17. In Fig. 3, the axes of the pegs 26 and 26a are in alinement with the crank shaft axis and the pistons are equally spaced. In Fig. 5, the crank shaft has been rotated counterclockwise through an angle of 45° thereby moving the axes of the two pegs out of alinement with the crank shaft axis and causing relative movement of the sleeves 28 and 29 to bring the piston A′ practically into contact with the piston B, and the piston A practically into contact with the piston B′ with corresponding separation of the piston A′ from the piston B′ and the piston A from the piston B as is shown in Fig. 6. In Fig. 7, the crank shaft has been rotated an additional 45° from the position shown in Fig. 5, thus bringing the axes of the pegs 26 again into alinement with the crank shaft axis and effecting relative rotation of the sleeves 28 and 29 to again equally space the pistons A and A′ from the pistons B and B′ as shown in Fig. 8. Further rotation of the crank shaft through a further 45° arc will cause relative rotation of the sleeves 28 and 29 to bring the piston A′ substantially into contact with the piston B′ and to bring the piston A substantially into contact with the piston B. Still further rotation of the crank shaft through another arc of 45° will cause relative rotation of the sleeves 28 and 29 to again bring the pistons into uniform spaced relation.

Fluid is admitted through the inlet to the space between two pistons while they are moving from a position in which they have minimum spacing to a position in which they have maximum spacing and is discharged through the outlet during the time that the pistons move from the position in which they have maximum spacing to a position in which they have minimum spacing. The outlets from both torus cylinders 15 may discharge into a common conduit or into separate conduits. The device may be constructed with one torus chamber, if desired, and other combinations of reciprocating pistons and rotating pistons than shown may be used. In a multi-stage pump the discharge from the torus cylinders 15 is fed to the cylinders 11.

Figure 13:
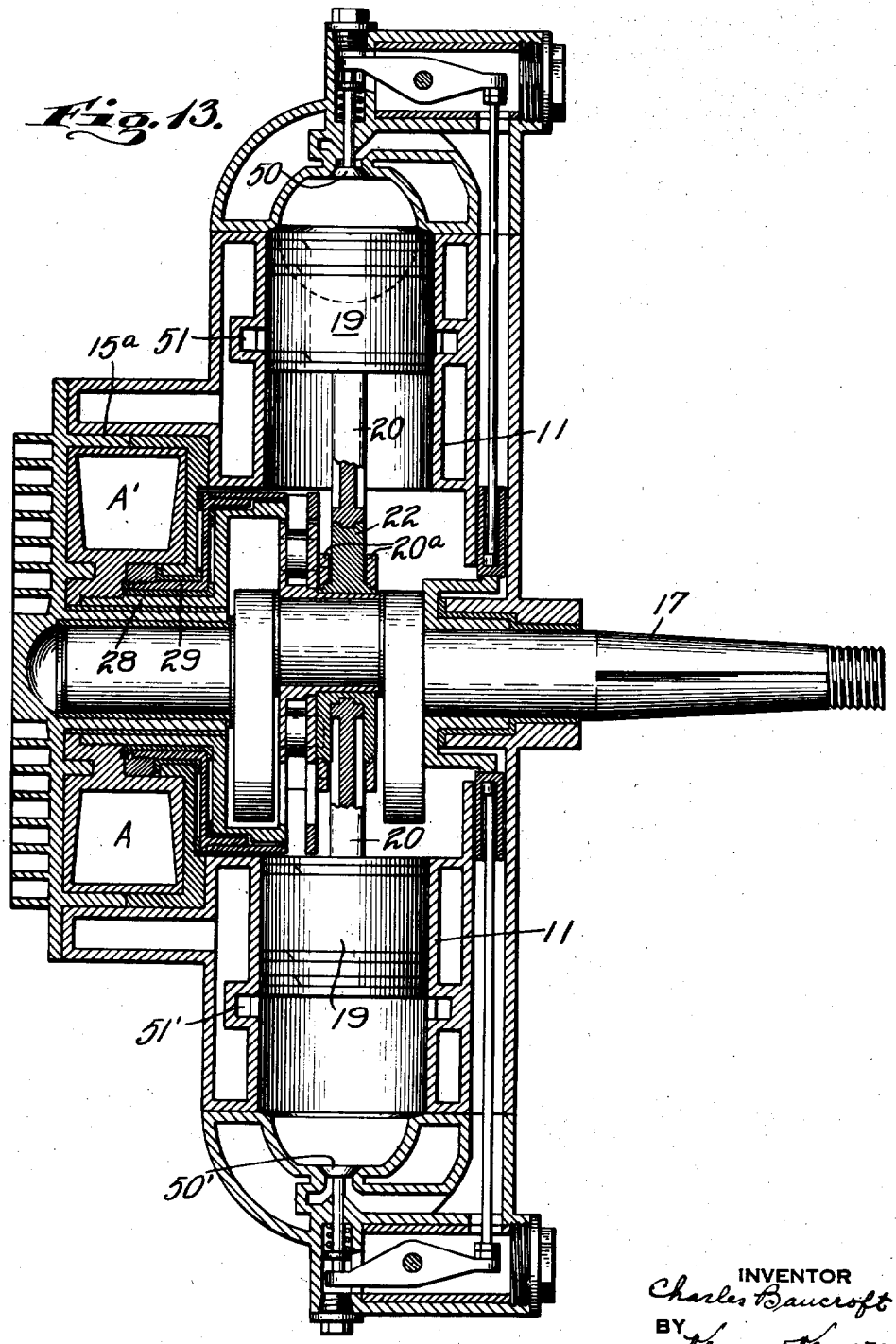
Fig. 13 is a vertical section through a different apparatus embodying the invention.

Fig. 13 illustrates the invention embodied in an internal combustion engine. The arrangement of cylinders 11, crank shaft 17, connecting rods 20 and 20a, member 22 and sleeves 28 and 29 is the same as in Fig. 1. Only one annular cylinder 15a is provided and it is of rectangular cross-section. The pistons A, A′, B and B′ are likewise of rectangular cross-section but operate in the same manner as previously described. Valves 50 and 50′ are provided for admitting partially compressed combustible fluids from pump to cylinders and ports 51 and 51′ are provided for exhausting the combustion gases. Also means (not shown) are provided for igniting the fuel. The power developed by the combustion of the fuel causes reciprocation of the pistons 19 and consequent rotation of the crank shaft 17 and member 22. The sleeves 28 and 29 are caused to rotate as previously described to effect motion toward and away from each other of the pistons A, A′, B and B′ to draw in and discharge fluid through the inlet 46 and outlet 47.

The casing 10 may be made up of sections suitably joined together to facilitate assembly. Also, while the member 22 makes one complete revolution with respect to the casing 10 for each complete revolution of the crank shaft, it makes two complete revolutions around the crank pin in a direction counter to the direction of rotation of the crank pin, one of such revolutions being neutralized with respect to the casing by a simultaneous movement of the crank pin in the opposite direction.

I claim:

1. Apparatus of the character described comprising a crank shaft having a crank pin, a unit rotatably mounted on said crank pin and including one or more disks eccentric to said crank pin, a rod for each disk having an aperture intermediate its ends in which said disk is journalled, means co-operating with the ends of each rod for effecting rectilinear reciprocation thereof, a pair of rotatable members coaxial with said crank shaft and arranged on the same side of said crank pin, a pair of blocks, radial guide means on one rotatable member engaged by one of said blocks, radial guide means on the remaining rotatable member engaged by the remaining block, and means pivotally connecting said blocks to said unit at equal distances from the crank pin axis and in alinement therewith.

2. Apparatus of the character described comprising a crank shaft having a crank pin, a unit rotatably mounted on said crank pin and including one or more disks eccentric to said crank pin, a rod for each disk having an aperture intermediate its ends in which said disk is journalled, means co-operating with the ends of each rod for effecting rectilinear reciprocation thereof, a pair of rotatable members coaxial with said crank shaft and arranged on the same side of said crank pin, a pair of blocks, radial guide means on one rotatable member engaged by one of said blocks, radial guide means on the remaining rotatable member engaged by the remaining block, and means pivotally connecting said blocks to said unit at equal distances from the crank pin axis and in alinement therewith, an annular cylinder coaxial with said crank shaft and two pairs of pistons in said annular cylinder, one pair of pistons being connected to one rotatable member and the remaining pair of pistons being connected to the remaining rotatable member, each piston of one pair being diametrically opposite the remaining piston of the same pair, and fluid inlet and outlet ports for said annular cylinder.

3. A prime mover comprising a crank shaft having a crank pin, a unit rotatably mounted on said crank pin and including one or more disks eccentric to said crank pin, a rod for each disk having an aperture intermediate its ends in which said disk is journalled, diametrically opposed cylinders, a piston connected to each end of each rod for reciprocation in one of said cylinders, motive fluid inlet and outlet ports for said cylinders, a pair of rotatable members coaxial with said crank shaft and arranged on the same side of said crank pin, a pair of blocks, radial guide means on one rotatable member engaged by one of said blocks, radial guide means on the remaining rotatable member engaged by the remaining block, and means pivotally connecting said blocks to said unit at equal distances from the crank pin axis and in alinement therewith.

4. Apparatus of the character described comprising a crank shaft, having a crank pin, a unit rotatably mounted on said crank pin and including one or more disks eccentric to said crank pin, a rod for each disk having an aperture intermediate its ends in which said disk is journalled, diametrically opposed cylinders, a piston connected to each end of each rod for reciprocation in one of said cylinders, a pair of rotatable members coaxial with said crank shaft and arranged on the same side of said crank pin, a pair of blocks, radial guide means on one rotatable member engaged by one of said blocks, radial guide means on the remaining rotatable member engaged by the remaining block, means pivotally connecting said blocks to said unit at equal distances from the crank pin axis and in alinement therewith, an annular cylinder coaxial with said crank shaft, two pairs of pistons in said annular cylinder, one pair of pistons being connected to one rotatable member and the remaining pair of pistons being connected to the remaining rotatable member, each piston of one pair being diametrically opposite the remaining piston of the same pair, and fluid inlet and outlet ports for said annular cylinder.

5. Apparatus of the character described comprising a crank shaft having a crank pin, a unit rotatably mounted on said crank pin and including one or more disks eccentric to said crank pin, a rod for each disk having an aperture intermediate its ends in which said disk is journalled, means co-operating with the ends of each rod for effecting rectilinear reciprocation thereof, a pair of rotatable members coaxial with said crank shaft and arranged on the same side of said crank pin, a radial guideway on each rotatable member, arms fixed to said unit in radially opposed relation with respect to said crank pin, and blocks pivotally attached to said arms at equal distances from the crank pin axis and engaging said guideways.

6. Apparatus of the character described comprising a crank shaft having a crank pin, a unit rotatably mounted on said crank pin and including one or more disks eccentric to said crank pin, a rod for each disk having an aperture intermediate its ends in which said disk is journalled, means co-operating with the ends of each rod for effecting rectilinear reciprocation thereof, a pair of rotatable members coaxial with said crank shaft and arranged on the same side of said crank pin, a radial guideway on each rotatable member, arms fixed to said unit in radially opposed relation with respect to said crank pin, blocks pivotally attached to said arms at equal distances from the crank pin axis and engaging said guideways, an annular cylinder coaxial with said crank shaft, two pairs of pistons in said annular cylinder, one pair of pistons being connected to one rotatable member and the remaining pair of pistons being connected to the remaining rotatable member, each piston of one pair being diametrically opposite the remaining piston of the same pair, and fluid inlet and outlet ports for said annular cylinder.

7. A prime mover comprising a crank shaft having a crank pin, a unit rotatably mounted on said crank pin and including one or more disks eccentric to said crank pin, a rod for each disk having an aperture intermediate its ends in which said disk is journalled, diametrically opposed cylinders, motive fluid inlet and outlet ports for said cylinders, a piston connected to each end of each rod for reciprocation in one of said cylinders, a pair of rotatable members coaxial with said crank shaft and arranged on the same side of said crank pin, a radial guideway on each rotatable member, arms fixed to said unit in radially opposed relation with respect to said crank pin, and blocks pivotally attached to said arms at equal distance from the crank pin axis and engaging said guideways.

8. Apparatus of the character described comprising a crank shaft having a crank pin, a unit rotatably mountd on said crank pin and including one or more disks eccentric to said crank pin, a rod for each disk having an aperture intermediate its ends in which said disk is journalled, diametrically opposed cylinders, a piston connected to each end of each rod for reciprocation in one of said cylinders, a pair of rotatable members coaxial with said crank shaft and arranged on the same side of said crank pin, a radial guideway on each rotatable member, arms fixed to said unit in radially opposed relation with respect to said crank pin, and blocks pivotally attached to said arms at equal distance from the crank pin axis and engaging said guideways, an annular cylinder coaxial with said crank shaft, two pairs of pistons in said annular cylinder, one pair of pistons being connected to one rotatable member and the remaining pair of pistons being connected to the remaining rotatable member, each piston of one pair being diametrically opposite the remaining piston of the same pair, and fluid inlet and outlet ports for said annular cylinder.

9. Apparatus according to claim 2 in which said annular cylinder and pistons are rectangular in cross-section.

10. Apparatus according to claim 4 in which said annular cylinder and pistons are rectangular in cross-section.

11. Apparatus according to claim 6 in which said annular cylinder and pistons are rectangular in cross-section.

12. A prime mover comprising a crank shaft having a crank pin, a unit rotatably mounted on said crank pin and including one or more disks eccentric to said crank pin, a bearing for each disk, a pair of pistons connected to each bearing, opposed cylinders receiving said pistons to limit said bearing to linear reciprocating motion, motive fluid inlet and outlet ports for said cylinders, a pair of rotatable members coaxial with said crank shaft and arranged on the same side of said crank pin, a pair of blocks, radial guide means on one rotatable member engaged by one of said blocks, radial guide means on the remaining rotatable member engaged by the remaining block, and means pivotally connecting said blocks to said unit at equal distances from the crank pin axis and in alinement therewith.

13. Apparatus of the character described comprising a crank shaft having a crank pin, a unit rotatably mounted on said crank pin and including one or more disks eccentric to said crank pin, a bearing for each disk, a pair of pistons connected to each bearing, opposed cylinders receiving said pistons to limit said bearing to linear reciprocating motion, fluid inlet and outlet ports for said opposed cylinders, a pair of rotatable members coaxial with said crank shaft and arranged on the same side of said crank pin, a pair of blocks, radial guide means on one rotatable member engaged by one of said blocks, radial guide means on the remaining rotatable member engaged by the remaining block, means pivotally connecting said blocks to said unit at equal distances from the crank pin axis and in alinement therewith, an annular cylinder coaxial with said crank shaft, two pairs of pistons in said annular cylinder, one pair of pistons being connected to one rotatable member and the remaining pair of pistons being connected to the remaining rotatable member, each piston of one pair being diametrically opposite the remaining piston of the same pair, and fluid inlet and outlet ports for said annular cylinder.

14. A prime mover comprising a crank shaft having a crank pin, a plurality of disks rotatably mounted on said crank pin eccentrically thereof and oriented relative to each other, bearings in which said disks are journalled, pistons attached to said bearings, opposed cylinders receiving said pistons to limit said bearings to linear reciprocating motion, motive fluid inlet and outlet ports for said cylinders, a pair of rotatable members coaxial with said crank shaft and arranged on the same side of said crank pin, a pair of blocks, radial guide means on one rotatable member engaged by one of said blocks, radial guide means on the remaining rotatable member engaged by the remaining block, and means pivotally connecting said blocks to said disks at equal distances from the crank pin axis and in alinement therewith.

15. Apparatus of the character described comprising a crank shaft having a crank pin, a plurality of disks rotatably mounted on said crank pin eccentrically thereof and oriented relative to each other, bearings in which said disks are journalled, pistons attached to said bearings, opposed cylinders receiving said pistons to limit said bearings to linear reciprocating motion, fluid inlet and outlet ports for said opposed cylinders, a pair of rotatable members coaxial with said crank shaft and arranged on the same side of said crank pin, a pair of blocks, radial guide means on one rotatable member engaged by one of said blocks, radial guide means on the remaining rotatable member engaged by the remaining block, means pivotally connecting said blocks to said disks at equal distances from the crank pin axis and in alinement therewith, an annular cylinder coaxial with said crank shaft, two pairs of pistons in said annular cylinder, one pair of pistons being connected to one rotatable member and the remaining pair of pistons being connected to the remaining rotatable member, each piston of one pair being diametrically opposite the remaining piston of the same pair, and fluid inlet and outlet ports for said annular cylinder.

16. Apparatus of the character described comprising a crank shaft having a crank pin, a unit rotatably mounted on said crank pin and including one or more disks eccentric to said crank pin, a rod for each disk having an aperture intermediate its ends in which said disk is journalled, means cooperating with the ends of each rod for effecting rectilinear reciprocation thereof, a pair of rotatable members coaxial with said crank shaft and arranged on the same side of said crank pin, and interconnections between said unit and said rotatable members for rotating the latter by the former with alternate acceleration and deceleration of said rotatable members.

17. Apparatus of the character described comprising a crank shaft having a crank pin, a unit rotatably mounted on said crank pin and including one or more disks eccentric to said crank pin, a rod for each disk having an aperture intermediate its end in which said disk is journalled, means cooperating with the ends of each rod for effecting rectilinear recoprocation thereof, a pair of rotatable members coaxial with said crank shaft and arranged on the same side of said crank pin, an annular cylinder coaxial with said crank shaft, two pairs of pistons in said annular cylinder, one pair of pistons being connected to one rotatable member and the remaining pair of pistons being connected to the remaining rotatable member, and interconnections between said unit and said rotatable members for rotating the latter by the former with alternate acceleration and deceleration of said pairs of pistons.

18. A prime mover comprising a crank shaft having a crank pin, a unit rotatably mounted on said crank pin and including one or more disks eccentric to said crank pin, a rod for each disk having an aperture intermediate its ends in which said disk is journalled, diametrically opposed cylinders, a piston connected to each end of each rod for reciprocation in one of said cylinders, motive fluid inlet and outlet ports for said cylinders, a pair of rotatable members coaxial with said crank shaft and arranged on the same side of said crank pin, and interconnections between said unit and said rotatable members for rotating the latter by the former with alternate acceleration and deceleration of said rotatable members.

19. Apparatus of the character described comprising a crank shaft having a crank pin, a pair of rotatable members coaxial with said crank shaft and arranged on the same side of said crank pin, an annular cylinder coaxial with said crank shaft, two pairs of pistons in said annular cylinder, one pair of pistons being connected to one rotatable member and the remaining pair of pistons being connected to the remaining rotatable member, a unit rotatably mounted on said crank pin and including one or more disks eccentric to said crank pin, a rod for each disk having an aperture intermediate its ends in which said disk is journalled, means co-operating with the ends of each rod for effecting rectilinear reciprocation thereof, interconnections between said unit and said rotatable members for rotating the latter by the former with alternate acceleration and deceleration of said pairs of pistons, and fluid inlet and outlet ports for said annular cylinder.

20. Apparatus of the character described comprising a crank shaft having a crank pin, a unit rotatably mounted on said crank pin and including one or more disks eccentric to said crank pin, a rod for each disk having an aperture intermediate its ends in which said disk is journalled, diametrically opposed cylinders, a piston connected to each end of each rod for reciprocation in one of said cylinders, a pair of rotatable members coaxial with said crank shaft and arranged on the same side of said crank pin, an annular cylinder coaxial with said crank shaft, two pairs of pistons in said annular cylinder, one pair of pistons being connected to one rotatable member and the remaining pair of pistons being connected to the remaining rotatable member, interconnections between said unit and said rotatable members for rotating the latter by the former with alternate acceleration and deceleration of said pairs of pistons, and fluid inlet and outlet ports for said annular cylinder.

21. A prime mover comprising a crank shaft having a crank pin, a unit rotatably mounted on said crank pin and including one or more disks eccentric to said crank pin, a bearing for each disk, a pair of pistons connected to each bearing, opposed cylinders receiving said pistons to limit said bearing to linear reciprocating motion, motive fluid inlet and outlet ports for said cylinders, a pair of rotatable members coaxial with said crank shaft and arranged on the same side of said crank pin, and interconnections between said unit and rotatable members for rotating the latter by the former with alternate acceleration and deceleration of said members.

22. Apparatus of the character described comprising a crank shaft having a crank pin, a unit rotatably mounted on said crank pin and including one or more disks eccentric to said crank pin, a bearing for each disk, a pair of pistons connected to each bearing, opposed cylinders receiving said pistons to limit said bearing to linear reciprocating motion, fluid inlet and outlet ports for said opposed cylinders, a pair of rotatable members coaxial with said crank shaft and arranged on the same side of said crank pin, an annular cylinder coaxial with said crank shaft, two pairs of pistons in said annular cylinder, one pair of pistons being connected to one rotatable member and the remaining pair of pistons being connected to the remaining rotatable member, interconnections between said unit and said rotatable members for rotating the latter by the former with alternate acceleration and deceleration of said pairs of pistons, and fluid inlet and outlet ports for said annular cylinder.

CHARLES BANCROFT.